(12) United States Patent
Meyer

(10) Patent No.: US 9,500,161 B2
(45) Date of Patent: Nov. 22, 2016

(54) NOZZLE, STRUCTURAL ELEMENT, AND METHOD OF PRODUCING A NOZZLE

(71) Applicant: DEUTSCHES ZENTRUM FUER LUFT-UND RAUMFAHRT E.V., Cologne (DE)

(72) Inventor: Robert Meyer, Dallgow-Doeberritz (DE)

(73) Assignee: Deutsches Zentrum fuer Luft- und Raumfahrt E.V., Cologne (DE)

( * ) Notice: Subject to any disclaimer, the term of this patent is extended or adjusted under 35 U.S.C. 154(b) by 387 days.

(21) Appl. No.: 14/062,211

(22) Filed: Oct. 24, 2013

(65) Prior Publication Data
US 2014/0319242 A1 Oct. 30, 2014

(30) Foreign Application Priority Data
Oct. 25, 2012 (DE) .................. 10 2012 219 541

(51) Int. Cl.
| | | |
|---|---|---|
| F02C 1/00 | (2006.01) | |
| F02K 1/46 | (2006.01) | |
| F02K 1/82 | (2006.01) | |
| F02K 1/38 | (2006.01) | |
| F02K 1/48 | (2006.01) | |

(52) U.S. Cl.
CPC ............ *F02K 1/46* (2013.01); *F02K 1/386* (2013.01); *F02K 1/48* (2013.01); *F02K 1/827* (2013.01); *Y10T 29/49323* (2015.01)

(58) Field of Classification Search
CPC ................... F02K 1/827; F02K 1/386
See application file for complete search history.

(56) References Cited

U.S. PATENT DOCUMENTS

| | | | |
|---|---|---|---|
| 5,598,990 A * | 2/1997 | Farokhi et al. | 244/200.1 |
| 6,360,528 B1 | 3/2002 | Brausch et al. | |
| 6,502,383 B1 | 1/2003 | Janardan et al. | |
| 7,735,601 B1 | 6/2010 | Stieger et al. | |
| 7,966,826 B2 | 6/2011 | Alkislar et al. | |
| 8,186,942 B2 * | 5/2012 | Haas | 415/145 |
| 8,307,659 B2 | 11/2012 | Rose et al. | |

(Continued)

FOREIGN PATENT DOCUMENTS

| | | |
|---|---|---|
| DE | 602006000051 T2 | 11/2007 |
| JP | 2002180903 A | 6/2002 |

OTHER PUBLICATIONS

Grothe et al., „Dubbel—Taschenbuch fuer den Maschinenbau", 23. Auflage. Berlin: Springer, 2011: pp. B47-B64."—ISBN e-ISBN 978-3-642-17306-6—Statement of Relevance.

(Continued)

*Primary Examiner* — Gerald L Sung
(74) *Attorney, Agent, or Firm* — Laurence A. Greenberg; Werner H. Stemer; Ralph E. Locher

(57) ABSTRACT

A nozzle, in particular an outlet nozzle of an aircraft jet engine, is formed with at least one nozzle wall. A turbulence-generating and/or vortex-generating structure is arranged on an inner face of the nozzle wall and projects radially inwardly from the nozzle wall. Alternatively, or in addition, a turbulence-generating and/or vortex-generating structure is arranged on an outer face of the nozzle wall and projects radially outwardly from the outer face. There is also described a structural element and a method of producing a nozzle.

8 Claims, 3 Drawing Sheets

(56) References Cited

U.S. PATENT DOCUMENTS

| | | | |
|---|---|---|---|
| 8,418,437 B2* | 4/2013 | Oba et al. | 60/264 |
| 8,544,278 B2 | 10/2013 | Sylla et al. | |
| 2004/0031258 A1 | 2/2004 | Papamoschou | |
| 2009/0320486 A1* | 12/2009 | Gutmark et al. | 60/770 |
| 2010/0031628 A1* | 2/2010 | Oba et al. | 60/226.1 |
| 2011/0315248 A1* | 12/2011 | Simpson et al. | 137/561 R |
| 2013/0219895 A1* | 8/2013 | Joshi | F01D 25/30 60/697 |

OTHER PUBLICATIONS

Grote, K-H., et al., "Taschenbuch für den Maschinenbau", 2011, pp. B47-B64, Springer, Berlin, Germany, e-ISBN 978-3-642-17306-6.

\* cited by examiner

NOZZLE, STRUCTURAL ELEMENT, AND METHOD OF PRODUCING A NOZZLE

BACKGROUND OF THE INVENTION

Field of the Invention

The invention relates to a nozzle, in particular an outlet nozzle of an aircraft jet engine, a structural element for arrangement on an inner or outer face of a nozzle, and also a method for producing a nozzle.

Aircraft drives generate considerable noise emissions during operation, which lead to noise pollution for passengers and the environment. In particular during the takeoff and landing phase of the aircraft, residents in the area surrounding airports are particularly affected, for example. In principle, all components of an engine may be sources of noise, wherein an intensity of the noise emission can be different from engine to engine and from operating state to operating state. A significant source of noise however is the nozzle or propelling nozzle of the engine, or the jet of exhaust gas guided through this nozzle.

The jet noise generated by the jet of exhaust gas includes basically two noise sources: what is known as a mixing noise and what is known as an impact-induced noise. The impact-induced noise occurs substantially in the case of supersonic nozzles and is relevant predominantly in military applications. By contrast, the mixing noise is dominant at subsonic numbers or at Mach numbers up to MA=1 and is therefore in particular also relevant for civil aviation. The mixing noise in this case is produced by mixing processes in a shear layer of the nozzle, wherein the shear layer is formed when a wall flow guided over an inner face of the nozzle wall meets, at a rear edge of the nozzle, a wall flow guided over an outer face of the nozzle wall.

U.S. Pat. No. 7,966,826 B2 discloses an aircraft which comprises an outlet nozzle of an engine with an outlet opening. The outlet opening has a periphery, wherein the periphery has a multiplicity of projections, which extend rearward. In this case, the projections have a triangular shape, wherein a tip is arranged aft of a base region.

The technical problem is to create a nozzle, in particular an outlet nozzle of an aircraft jet engine, a structural element, and also a method for producing a nozzle, which enable simple production of a nozzle, wherein an intensity of the audible noise generated by the nozzle during operation of the nozzle is reduced.

BRIEF SUMMARY OF THE INVENTION

The technical problem is solved by the subjects having the features as claimed. Further advantageous embodiments emerge from the dependent claims.

A nozzle is proposed, in particular an outlet nozzle of an aircraft jet engine, wherein the nozzle comprises at least one nozzle wall or nozzle walling.

A basic concept of the invention is that a turbulence-generating and/or vortex-generating structure is arranged on an inner face and/or on an outer face of the nozzle wall and, during operation of the nozzle, swirls the wall flow guided along the corresponding face. The flows swirled as a result by means of the turbulence-generating and/or vortex-generating structure form a shear layer at a rear edge of the nozzle, said shear layer generating a mixing noise, wherein acoustic energy is no longer contained in low-frequency and long-wave vortices, as is the case with conventional nozzles, but in high-frequency and therefore short-wave vortices. Noise generated by these high-frequency vortices is not audible in this case, and therefore noise pollution in the audible range during operation of the nozzle is reduced.

In accordance with the invention, a turbulence-generating and/or vortex-generating structure is arranged on an inner face of the nozzle wall. In this case, a turbulence-generating structure denotes a structure which increases a turbulent proportion of a flow guided along the structure and reduces a laminar proportion. In this case, a vortex-generating structure denotes a structure which generates predetermined vortex structures, in particular longitudinal vortices, in the flow guided past the structure. In this case, longitudinal vortices denote vortices of which the vortex axis is oriented parallel to a central longitudinal axis of the nozzle.

Furthermore, at least part of the structure protrudes radially inwardly from the nozzle wall. The nozzle can be constructed in particular rotationally symmetrically about the central longitudinal axis of the nozzle. In a cross section through the nozzle with a plane of section perpendicular to the central longitudinal axis, the structure has a predetermined height in the radial direction toward the midpoint. In this case, the height along at least part of an inner periphery of the nozzle wall can be constant or variable. At least part of the structure arranged on the inner face of the nozzle wall is therefore formed as a structure raised from the nozzle wall.

Alternatively or additionally, a turbulence-generating and/or vortex-generating structure is arranged on an outer face of the nozzle wall and protrudes radially outwardly from the outer face. In a cross section through the nozzle with a plane of section perpendicular to the central longitudinal axis, the structure has a predetermined height in the radial direction away from the midpoint. At least part of the structure arranged on the outer face of the nozzle wall is therefore formed as a structure raised from the outer face.

It is possible for the nozzle to comprise a first nozzle wall for delimiting or guiding a core jet, and to comprise a further nozzle wall for delimiting or guiding what is known as a bypass jet. The proposed turbulence-generating and/or vortex-generating structures can be arranged in this case both on inner faces of the first and the further nozzle wall and on outer faces of the first and further nozzle wall.

The arrangement of turbulence-generating and/or vortex-generating structures advantageously enables a swirling of a wall flow, guided along the inner face and/or along the outer face, during operation of the nozzle, for example during flying operations. As explained beforehand, the mixing process generated in a shear layer forming at the rear edge of the nozzle is influenced hereby in such a way that a proportion of low-frequency, long-wave vortices, which generate audible noise, is reduced and a proportion of high-frequency, short-wave vortices is increased. Noise pollution in the audible range can thus be reduced advantageously by the proposed nozzle.

In a further embodiment, a height of the structure in the radial direction is dependent on a boundary layer thickness of a local jet flow through the nozzle. A boundary layer thickness is defined in this case as a distance from the inner face of the nozzle wall or the outer face of the nozzle wall at which the flow velocity of the exhaust gas flow guided through the nozzle has reached a predetermined proportion, for example 99%, of a central flow velocity. In this case, the central flow velocity for example describes the flow velocity in the central longitudinal axis of the nozzle and may be the maximum velocity of the flow.

An easily implemented construction of a nozzle is thus advantageously produced, since a construction parameter of the turbulence-generating and/or vortex-generating structure, specifically the height thereof, can be selected in accordance with parameters specific to nozzle operation, in particular a distribution of the flow velocity.

In a preferred embodiment, the structure is formed as a zigzag-shaped structure. For example, a zigzag-shaped structure can be described by a distance between jags arranged on the same side of the zigzag-shaped structure and/or by a jag angle and/or by a jag width, that is to say a distance between jags arranged on opposite sides of the zigzag-shaped structure. The zigzag-shaped structure can be formed in this case in an annular manner or in the shape of a hollow cone and may extend along at least part of an inner periphery and/or an outer periphery of the nozzle. In this case, a jag height describes the previously explained height of the structure in the radial direction when the zigzag-shaped structure is arranged on the inner face and/or outer face. The most effective generation possible of turbulences and longitudinal vortices in the exhaust gas jet flowing past the zigzag-shaped structure, and therefore an effective reduction of audible noise, is advantageously produced as a result.

In a further embodiment, the jag height is selected in accordance with the boundary layer thickness of the local jet flow. In particular, the jag height may lie in a range of 0.1 times to 2.0 times the boundary layer thickness.

Alternatively or additionally, a jag spacing can be selected in accordance with an inner periphery of the nozzle wall or an outer periphery of the nozzle wall. For example, the jag distance can be selected in such a way that 8 to 16 jags are arranged along the inner or outer periphery respectively. Alternatively or additionally, a jag angle may lie in an angular range from 30° to 90°. The previously explained construction parameters of the zigzag-shaped structure advantageously enable a design of the zigzag-shaped structure that enables a particularly effective reduction of the audible noise during operation of the nozzle.

In an alternative embodiment, the structure is formed as a grained structure. In this case, a grained structure may be understood for example to mean a sandpaper-like or abrasive paper-like structure. The grained structure can be formed in a strip-shaped manner for example. In this case, the grained structure may have a predetermined width and a predetermined maximum height. If the structure is formed as a grained structure, the graining thus serves to generate turbulences in a flow guided along the grained structure.

In a further embodiment, a grain size or average grain size of grains of the grained structure is selected in accordance with the previously explained boundary layer thickness of the local jet flow. In particular, a grain size in a range from 0.05 times to 0.5 times the boundary layer thickness can be selected.

The most effective generation possible of turbulences and therefore an effective reduction of audible noise are thus advantageously produced.

In a further embodiment, an end of the structure arranged to the rear in the direction of the jet flow is distanced with a predetermined spacing from a rear edge of the nozzle. In this case, turbulences and/or vortices are generated before the rear edge of the nozzle in the direction of the jet flow, the inner face of the nozzle wall meeting with the outer face of the nozzle wall at said rear edge of the nozzle.

In this case, it is possible for the structure to have a predetermined width, wherein the width denotes a dimension in the direction of the jet flow along the corresponding face.

The distance from the rear edge of the nozzle may be selected, in particular in the case of a zigzag-shaped structure, for example from a range which comprises distances greater than 0 and up to 2 times the previously explained jag spacing.

Due to the early generation of turbulences and/or vortices therefore achieved during operation, the most effective noise reduction possible can advantageously be achieved.

In a further embodiment, an end of the structure arranged to the rear in the direction of the jet flow terminates with the rear edge of the nozzle. In this case, the structure is thus arranged at the end of the nozzle arranged to the rear in the direction of the jet flow, that is to say at the outlet of the nozzle, and extends with a predetermined width of the structure into the nozzle.

The simplest possible attachment and alignment of the structure in a nozzle, for example provided conventionally, is thus produced.

Furthermore, a structural element for arrangement on an inner face or outer face of a nozzle wall of a nozzle, in particular an outlet nozzle of an aircraft engine, is proposed.

In accordance with the invention, the structural element is formed in such a way that it forms a first turbulence-generating and/or vortex-generating structure when it is arranged on an inner face of a nozzle wall in such a way that it protrudes radially inwardly from this inner face of the nozzle wall. Alternatively, the structural element may be formed in such a way that it forms a turbulence-generating and/or vortex-generating structure when it is arranged on an outer face of the nozzle wall in such a way that it protrudes radially outwardly from the outer face of the nozzle wall. In particular, the structural element may be formed in a zigzag-shaped manner or may have a grained structure.

A structural element which can be arranged retrospectively in a nozzle of an aircraft, said nozzle already being present for example, is thus advantageously produced, whereby effective noise reduction is achieved in a simple manner.

A method for producing a nozzle, in particular an outlet nozzle of an aircraft jet engine, is also proposed. In this case, at least one first turbulence-generating and/or vortex-generating structure is provided, for example in the form of a previously described structural element. The at least first turbulence-generating and/or vortex-generating structure is arranged on an inner face of the nozzle wall in such a way that it protrudes radially inwardly from the nozzle wall and extends along at least part of an inner periphery of the nozzle wall. Alternatively or additionally, at least one further turbulence-generating and/or vortex-generating structure is provided, wherein the at least one further turbulence-generating and/or vortex-generating structure is arranged on an outer face of the nozzle wall in such a way that it protrudes radially outwardly from the nozzle wall and extends along at least part of an outer periphery of the nozzle wall.

A method that is as simple as possible, in particular for retrospectively fitting a nozzle, which for example is already present, with a turbulence-generating and/or vortex-generating structure with the result that noise generation during operation of the nozzle can be considerably reduced, is thus advantageously produced.

BRIEF DESCRIPTION OF THE SEVERAL
VIEWS OF THE DRAWING

The invention will be explained in greater detail with the aid of a number of exemplary embodiments. In the figures.

DESCRIPTION OF THE INVENTION

Figure 1:
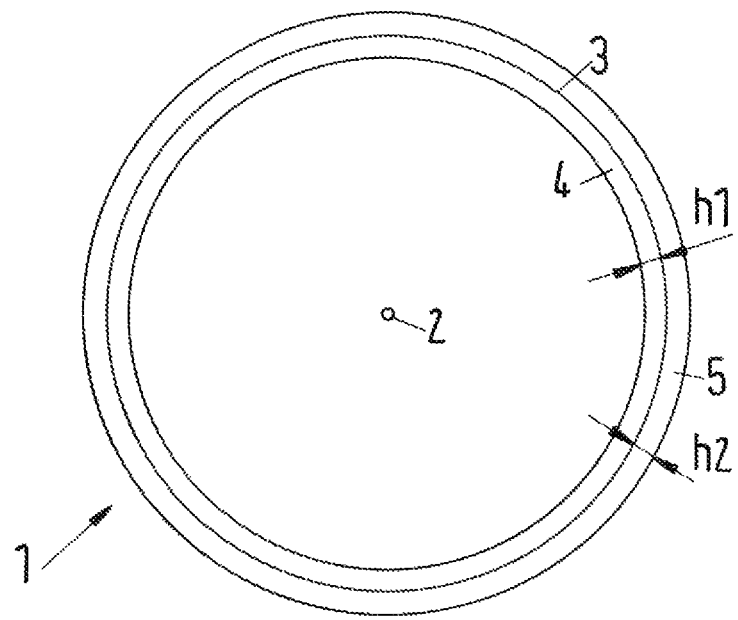
FIG. 1 shows a schematic cross section through a nozzle.

A schematic cross section of a nozzle 1 is illustrated in FIG. 1. In this case, the cross section runs in a cross-sectional plane which is oriented perpendicular to a central longitudinal axis 2 of the nozzle 1, wherein the central longitudinal axis 2 is oriented in a direction out from the drawing plane. The nozzle 1 comprises a nozzle wall 3. A first turbulence-generating and/or vortex-generating structure 4 is arranged on an inner face of the nozzle wall 3 and protrudes radially inwardly from the nozzle wall 3 and, in this radial direction, has a first height h1. A further turbulence-generating and/or vortex-generating structure 5 is arranged on an outer face of the nozzle wall 3 and protrudes radially outwardly from the outer face and has a further height h2. In this case, it is illustrated that the heights h1, h2 are constant along an inner periphery and outer periphery respectively of the nozzle wall 3. The first structure 4 also extends along the entire inner periphery of the nozzle wall 3, and the further structure 5 extends along the entire outer periphery of the nozzle wall 3. Of course, it is conceivable for the heights h1, h2 along the inner periphery and outer periphery respectively to vary and/or for the structures to extend only along part of the inner and outer periphery.

The heights h1, h2 of the structures 4, 5 are selected in accordance with a boundary layer thickness of a jet flow which flows along the inner face of the nozzle wall 3 and along the outer face of the nozzle wall 3 respectively.

Figure 2:
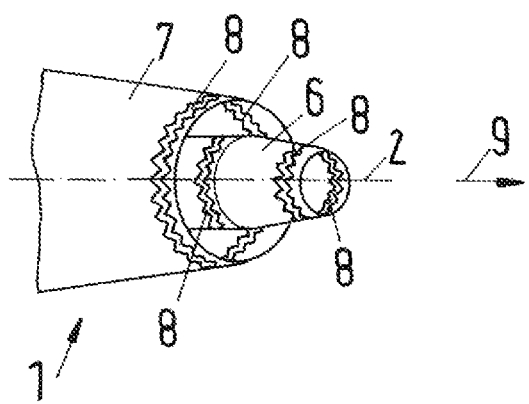
FIG. 2 shows a perspective view of a further nozzle.

A perspective illustration of a further nozzle 1 is illustrated in FIG. 2. The nozzle 1 comprises a first nozzle wall 6 for guiding a core flow and a further nozzle wall 7 for guiding what is known as a bypass flow. Zigzag-shaped structures 8, which are arranged on inner faces of the first and further nozzle wall 6, 7 and on outer faces of the first and further nozzle wall 6, 7, are also illustrated. A central longitudinal axis 2 and a jet flow direction of a jet of exhaust gas flowing through the nozzle 1, symbolized by an arrow 9, is also illustrated.

Figure 3:
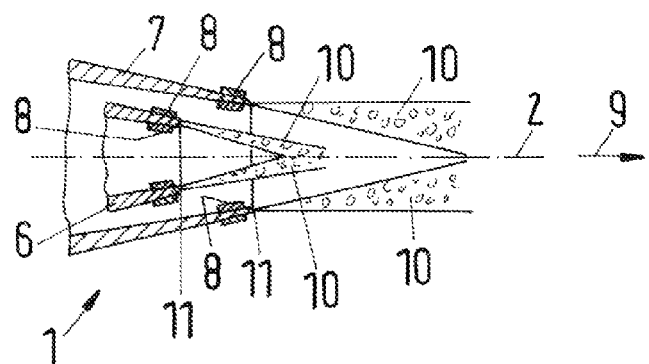
FIG. 3 shows a cross section through the nozzle illustrated in FIG. 2.

A lateral cross section through the nozzle 1 illustrated in FIG. 2 is illustrated in FIG. 3. Here, it can be seen that the zigzag-shaped structures 8 protrude radially inwardly from the inner face of the first nozzle wall 6 and the further nozzle wall 7 and protrude radially outwardly from the outer face of the first and further nozzle wall 6, 7. Here, a jag height denotes the height of the zigzag-shaped structure in the radial direction, which is oriented inwardly in the case of the zigzag-shaped structures 8 arranged on the inner faces, that is to say is oriented toward the central longitudinal axis 2, and is oriented outwardly in the case of the zigzag-shaped structures 8 arranged on the outer faces, that is to say is oriented away from the central longitudinal axis 2. Shear layers 10, which are formed after a rear edge 11 of the nozzle in the jet flow direction 9 and are formed from the wall flows guided along the outer face and the inner face are also illustrated. These shear layers 10, or the turbulences present therein, generate the previously described mixing noise.

Figure 4:
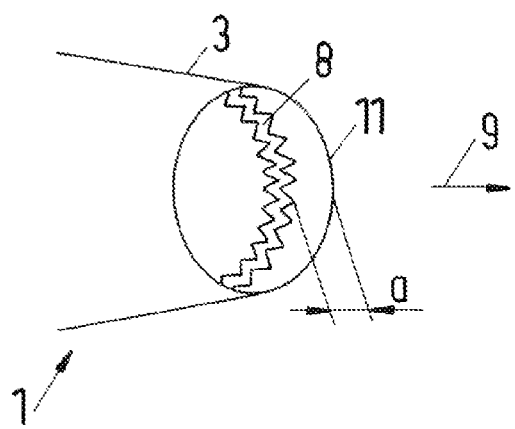
FIG. 4 shows a perspective view of a further nozzle.

A schematic illustration of a further nozzle 1 is illustrated in FIG. 4. The nozzle 1 comprises a nozzle wall 3 and zigzag-shaped structure 8, wherein the zigzag-shaped structure 8 is distanced in the jet flow direction 9 with a predetermined spacing a from a rear edge 11 of the nozzle 1 or the nozzle wall 3. It is illustrated here that jags of the zigzag-shaped structure 8 that are arranged to the rear in the jet flow direction 9, in particular the points formed by these jags, are distanced with a predetermined spacing a from the rear edge 11 of the nozzle.

Figure 5:
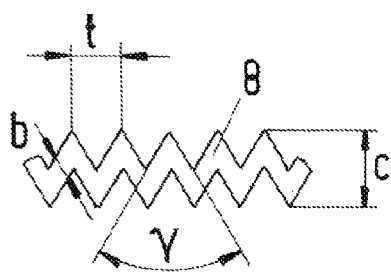
FIG. 5 shows a schematic illustration of a zigzag-shaped structure.

A schematic illustration of a zigzag-shaped structure 8 is illustrated in FIG. 5. In particular, a jag spacing t is illustrated, which denotes the distance between two jag points following one another on the same side of the zigzag-shaped structure 8. A jag angle γ, which describes the angle enclosed by the branches that form a jag point, is also illustrated. A jag width c, which denotes a spacing between two jag points following one another along the zigzag-shaped structure 8, but arranged on opposite sides of the zigzag-shaped structure 8, is also illustrated. A web width b of the zigzag-shaped structure 8 is also illustrated. A height of the zigzag-shaped structure 8, which in FIG. 5 can be described as the height of the zigzag-shaped structure 8 along a direction pointing into the drawing plane, is not illustrated. This height can be determined in accordance with the local boundary layer thickness. For example, the height results in the following $$h = (0.1 \ldots 2.0) \times d_{GS} \quad \text{formula 1}$$

wherein $d_{GS}$ denotes the boundary layer thickness. For example, the following is true for the jag spacing t $$t = (\tfrac{1}{8} \ldots \tfrac{1}{16}) \times U \quad \text{formula 2}$$

wherein U denotes the periphery of the nozzle wall 3, 6, 7 (for example see FIG. 1 and FIG. 3) along the inner face or outer face. For example, the following is true for the jag angle γ

$$\gamma = 30° \ldots 90° \quad \text{formula 3}$$

For example, the following is true for the predetermined distance a (for example see FIG. 4)

$$a = (0 \ldots 2) \times t \quad \text{formula 4}$$

wherein t is the previously explained jag spacing t.

Figure 6:
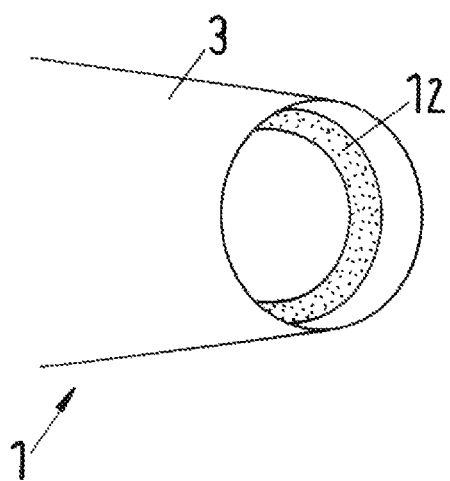
FIG. 6 shows a perspective view of a further nozzle.

A further embodiment of a nozzle 1 is illustrated in FIG. 6. In this case, a strip 12 is arranged on an inner face of a nozzle wall 3, wherein the strip 12 has or forms a grained structure. A grain size k or average grain size may then be selected accordingly as follows $$k = (0.05 \ldots 0.5) \times d_{GS} \quad \text{formula 5}$$

wherein $d_{GS}$ again denotes the boundary layer thickness.

The structures 4, 5 illustrated for example in FIG. 1 increase a turbulence in a boundary layer flow along the inner face and outer face respectively of the nozzle wall 3, 6, 7 and therefore increase a mixing distribution in the shear layers 10 (see FIG. 1 and FIG. 3). For example, a zigzag-shaped structure 8 (for example see FIG. 2) intensifies the mixing in the shear layer 10 and considerably reduces the mixing noise in the audible range.

The zigzag-shaped structure 8 can be formed for example as a band-shaped structural element and can be arranged retrospectively in a nozzle 1. This ensures that the flows are more turbulent early on. A desired turbulence can also be generated selectively by means of the zigzag-shaped structure 8.

The invention claimed is:

1. A nozzle, comprising:
   a nozzle wall having an inner face and an outer face, and
   one or both of the following:

a turbulence-generating and/or vortex-generating structure disposed on said inner face of said nozzle wall and projecting radially inwardly from said nozzle wall, said turbulence-generating and/or vortex-generating structure, which is disposed on said inner face of said nozzle wall, having in a radially inward direction, a height being constant along an inner periphery of said nozzle wall, said turbulence-generating and/or vortex-generating structure, which is disposed on said inner face of said nozzle wall, extending along an entire amount of said inner periphery of said nozzle; and/or a turbulence-generating and/or vortex/generating structure disposed on said outer face of said nozzle wall and projecting radially outwardly from said outer face, said turbulence-generating and/or vortex-generating structure, which is disposed on an outer face of said nozzle wall, having a height being constant along an outer periphery of said nozzle wall, said turbulence-generating and/or vortex-generating structure, which is disposed on an outer face of said nozzle wall, extending along an entire amount of said outer periphery of said nozzle wall;

wherein at least one structure selected from the group consisting of said turbulence-generating and/or vortex-generating structure disposed on said inner face of said nozzle wall and said turbulence-generating and/or vortex/generating structure disposed on said outer face of said nozzle wall is a zigzag-shaped structure.

2. The nozzle according to claim 1, which is configured as an outlet nozzle of an aircraft jet engine.

3. The nozzle according to claim 1, wherein said at least one structure, which is selected from the group consisting of said turbulence-generating and/or vortex-generating structure disposed on said inner face of said nozzle wall and said turbulence-generating and/or vortex/generating structure disposed on said outer face of said nozzle wall, has an end disposed rearwardly in a jet flow direction that is distanced with a predetermined spacing from a rear edge of the nozzle.

4. The nozzle according to claim 1, wherein said at least one structure, which is selected from the group consisting of said turbulence-generating and/or vortex-generating structure disposed on said inner face of said nozzle wall and said turbulence-generating and/or vortex/generating structure disposed on said outer face of said nozzle wall, has an end disposed rearwardly in a jet flow direction that terminates with a rear edge of the nozzle.

5. In combination with a nozzle having a nozzle wall, a structural element assembly for placement on an inner face or an outer face of the nozzle wall of the nozzle, comprising:

a structural element configured to form a turbulence-generating and/or vortex-generating structure being arranged on the inner face of the nozzle wall projecting radially inwardly from the nozzle wall or being arranged on the outer face of the nozzle wall and projecting radially outwardly from the nozzle wall;

wherein when the structural element is configured to form the turbulence-generating and/or vortex-generating structure arranged on the inner face of the nozzle wall, the turbulence-generating and/or vortex-generating structure, which is disposed on the inner face of the nozzle wall, has a height that is constant along an inner periphery of the nozzle wall, and wherein the turbulence-generating and/or vortex-generating structure, which is disposed on the inner face of the nozzle wall, extends along an entire amount of the inner periphery of the nozzle wall;

wherein when the structural element is configured to form the turbulence-generating and/or vortex-generating structure arranged on the outer face of the nozzle wall, the turbulence-generating and/or vortex-generating structure, which is disposed on an outer face of the nozzle wall, has a height that is constant along an outer periphery of the nozzle wall, wherein the turbulence-generating and/or vortex-generating structure, which is disposed on an outer face of the nozzle wall, extends along an entire amount of the outer periphery of the nozzle wall; and wherein the structural element is a zigzag-shaped structure.

6. The combination according to claim 5, wherein the nozzle is an outlet nozzle of an aircraft engine.

7. A method of producing a nozzle, the method comprising:

providing at least one zigzag-shaped structure selected from the group consisting of at least one first turbulence-generating and/or vortex-generating structure and at least one further turbulence-generating and/or vortex-generating structure:

when providing the at least one first turbulence-generating and/or vortex-generating structure, arranging the at least one first turbulence-generating and/or vortex-generating structure on an inner face of a nozzle wall of the nozzle, to project radially inwardly from the nozzle wall and to extend along at least part of an inner periphery of the nozzle wall, wherein the turbulence-generating and/or vortex-generating structure, which is disposed on the inner face of the nozzle wall, has in a radially inward direction, a height that is constant along an inner periphery of the nozzle wall, and wherein the turbulence-generating and/or vortex-generating structure, which is disposed on the inner face of the nozzle wall, extends along the inner periphery of the nozzle wall in its entirety; and when providing the at least one further turbulence-generating and/or vortex-generating structure, arranging the at least one further turbulence-generating and/or vortex-generating structure on an outer face of the nozzle wall of the nozzle, to project radially outwardly from the nozzle wall and to extend along at least part of an outer periphery of the nozzle wall, wherein the turbulence-generating and/or vortex-generating structure, which is disposed on an outer face of the nozzle wall, has a height that is constant along an outer periphery of the nozzle wall, and wherein the turbulence-generating and/or vortex-generating structure, which is disposed on an outer face of the nozzle wall, extends along the outer periphery of the nozzle wall in its entirety.

8. The method according to claim 7, which comprises forming an outlet nozzle of an aircraft jet engine.

* * * * *